(No Model.) 2 Sheets—Sheet 1.
G. RICHARDSON.
DRAIN PIPE.
No. 461,891. Patented Oct. 27, 1891.
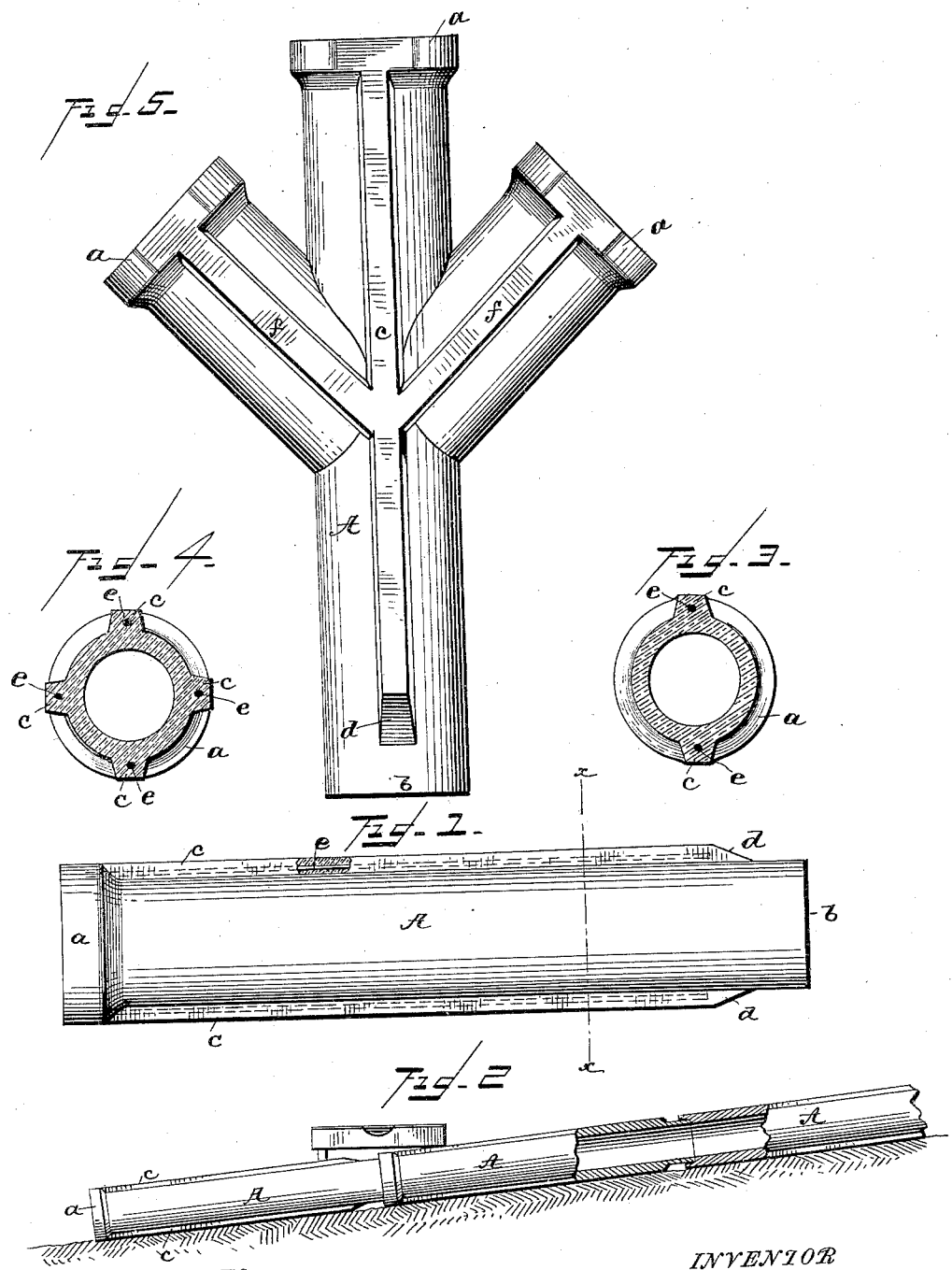
WITNESSES
INVENTOR
George Richardson (No Model.) 2 Sheets—Sheet 2.
G. RICHARDSON.
DRAIN PIPE.
No. 461,891. Patented Oct. 27, 1891.
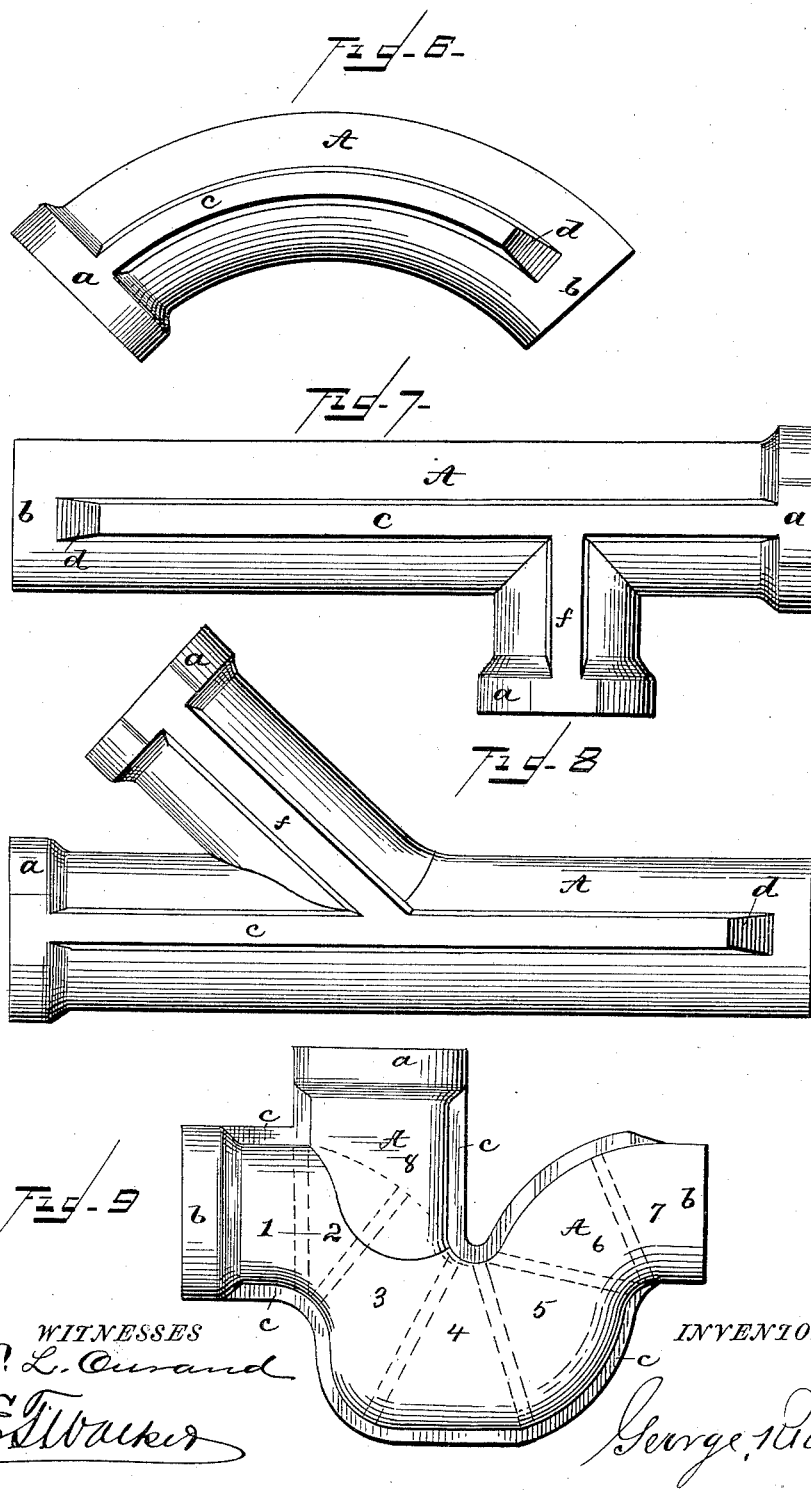
WITNESSES
INVENTOR
George Richardson

UNITED STATES PATENT OFFICE.

GEORGE RICHARDSON, OF WASHINGTON, DISTRICT OF COLUMBIA.

DRAIN-PIPE.

SPECIFICATION forming part of Letters Patent No. 461,891, dated October 27, 1891.

Application filed October 16, 1889. Serial No. 327,157. (No model.)

*To all whom it may concern:*

Be it known that I, GEORGE RICHARDSON, a citizen of the United States, residing at Washington, in the District of Columbia, have invented certain new and useful Improvements in Drain-Pipes; and I do hereby declare the following to be a full, clear, and exact description of the invention, such as will enable others skilled in the art to which it appertains to make and use the same.

My invention relates to that class of pipes known as "drain or sewer pipes," and which are used for conveying water, gas, or any other material usually conveyed in pipes. In laying sewer or drain pipes of the common form having a hub end the various sections of the pipes are supported upon the bottom of the ditch only at their joints, leaving the remainder of the pipe entirely unsupported until the ditch is filled, and then only by the loose dirt, which cannot be firmly packed under the pipe, and in leveling the pipe it is often difficult to find a support at the joint for the spirit-level, owing to the hub enlargement at the joint.

The object of my present invention is to overcome these objections, as well as to more thoroughly strengthen the sections of the pipe; and it consists in certain novel features of construction and arrangement of parts which will be hereinafter more fully described, and distinctly pointed out in the claims.

In the accompanying drawings I have shown various forms of pipes with my invention applied thereto, in which—

Figure 1 shows a side elevation of a single section of my improved pipe, one of the ribs being partly in section, showing the strengthening-rod. Fig. 2 shows three sections of my pipe connected in an inclined ditch, showing the manner of supporting the spirit-level. Fig. 3 is a vertical cross-section of the pipe on the line $xx$ of Fig. 1, showing the strengthening-rods. Fig. 4 is a similar section of a modified form of pipe. Fig. 5 is a top view of a section of pipe having two inclined branches. Fig. 6 shows a section of curved pipe. Fig. 7 shows a section of straight pipe provided with a branch at right angles thereto. Fig. 8 shows a section of straight pipe provided with a single inclined branch. Fig. 9 shows the manner of forming a sewer-trap.

The same letters and figures of reference indicate identical parts in all the figures.

Referring to the drawings, A indicates the pipe, the bore of which may be of any desirable shape in cross-section; but I have shown them provided with circular openings. One end of the pipe is provided with the ordinary hub and enlarged socket $a$, the socket of which tapers to about the size of the opposite end $b$ of the pipe in order to receive the small end of a similar section, in order to leave a space in the socket around the pipe for the reception of cement packing. Each section of pipe is provided on diametrically opposite sides with flattened ribs $c$, the flat surfaces of which are in the plane of the hub or enlargement $a$, and said ribs extend within a short distance of the opposite end $b$, where I prefer to taper them toward the end $b$, as shown at $d$. In each of the ribs $c$ is a rod $e$ for the purpose of strengthening the ribs; but this is not essential.

In straight pipes I may provide the same with four parallel ribs located at right angles to each other, as shown in Fig. 4; but in the case of curved pipes and those provided with branch pipes, as shown in Figs. 5, 6, 7, and 8, I prefer to form the ribs at top and bottom of the pipes, the ribs $f$ on the branch pipes being joined to or integral with the ribs $c$ on the main section A. In laying lines of such pipe it often becomes necessary to provide a section with one or more branches. This I accomplish by cutting an opening in the main-line section and fitting another section thereto, as shown in Figs. 5, 7, and 8, and connecting the two by means of cement or otherwise, the branch section being so connected that the ribs $c$ will be in the plane of the ribs on the main section. I may also form sewer-traps, when required, in the same manner by cutting either a straight or curved pipe in as many sections as necessary to form the trap and connecting the various sections together with cement or otherwise, as shown in Fig. 9, the dotted lines being the connecting-lines, the sections 2, 3, 5, 6, and 7 being cut from a curved pipe-section, and the sections 1, 4, and 8 being cut from a straight pipe-section.

The advantages resulting from my invention will be readily appreciated by those skilled in laying hub-end pipes, as each section of pipe will be in direct contact with the solid ground throughout its entire length, which prevents sagging of the pipes, and at the same time a continuous flat surface is provided on the upper side of the pipe in the plane of the hub at the end for supporting the leveling-instrument, which latter feature is of special advantage in laying pipes having a hub end and socket, as a level surface is provided at the joint for the leveling-instrument.

Having thus described my invention, what I claim is—

1. A pipe having a hub and socket at one end and two parallel ribs, one on top and one on bottom of said pipe, substantially as and for the purpose described.

2. A pipe having a hub and socket and two parallel flat ribs, one on top and one on bottom thereof, the outer surface of said ribs being on the plane of the hub, substantially as and for the purpose described.

3. A pipe having a hub and socket at one end and two or more parallel longitudinal ribs formed thereon, and a strengthening-rod in said ribs, substantially as and for the purposes described.

4. A pipe having a hub and socket at one end and one or more branches leading therefrom, said pipe and branches having two or more flat ribs formed on diametrically-opposite sides of said pipe, substantially as and for the purposes described.

In testimony whereof I affix my signature in presence of two witnesses.

GEORGE RICHARDSON.

Witnesses:
E. T. WALKER,
F. W. RITTER, Jr.